United States Patent
Kodama et al.

(10) Patent No.: US 7,088,464 B2
(45) Date of Patent: Aug. 8, 2006

(54) IMAGE PROCESSING DEVICE

(75) Inventors: Mari Kodama, Ebina (JP); Ryuichi Ishizuka, Ebina (JP); Yasushi Nishide, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 832 days.

(21) Appl. No.: 10/173,773

(22) Filed: Jun. 19, 2002

(65) Prior Publication Data
US 2002/0196464 A1      Dec. 26, 2002

(30) Foreign Application Priority Data
Jun. 20, 2001  (JP)  ............................. 2001-187235

(51) Int. Cl.
*G06F 15/00*  (2006.01)
(52) U.S. Cl. ....................... 358/1.15; 358/1.9; 358/3.01
(58) Field of Classification Search ................. 358/1.1, 358/1.5, 1.9, 2.1, 3.01, 1.15
See application file for complete search history.

(56) References Cited

U.S. PATENT DOCUMENTS

| | | | | |
|---|---|---|---|---|
| 6,116,720 A | * | 9/2000 | Inui et al. ...................... | 347/43 |
| 6,189,993 B1 | * | 2/2001 | Mantell ........................ | 347/15 |
| 6,809,839 B1 | * | 10/2004 | Earl et al. ..................... | 358/1.9 |
| 6,894,805 B1 | * | 5/2005 | Degani et al. ................ | 358/1.4 |
| 6,950,209 B1 | * | 9/2005 | Das ............................ | 358/3.01 |

FOREIGN PATENT DOCUMENTS

JP    A 2000-352813    12/2000

* cited by examiner

*Primary Examiner*—Mark Wallerson
(74) *Attorney, Agent, or Firm*—Oliff & Berridge, PLC

(57) ABSTRACT

An image processing device is structured such that it is possible to simply and appropriately determine presence/absence of an image for which overprinting has been designated, or the image. In a print server, when an overprint warning function is set, detecting and extracting of an image for which overprinting has been designated are carried out. Thereafter, when the image for which overprinting has been designated is detected, warning is given to a client terminal, and image processing and printing processing for a corresponding image are set so as to clarify the corresponding image. In this way, the image for which overprinting has been designated can be correctly determined on a printed matter outputted from a printer.

11 Claims, 8 Drawing Sheets

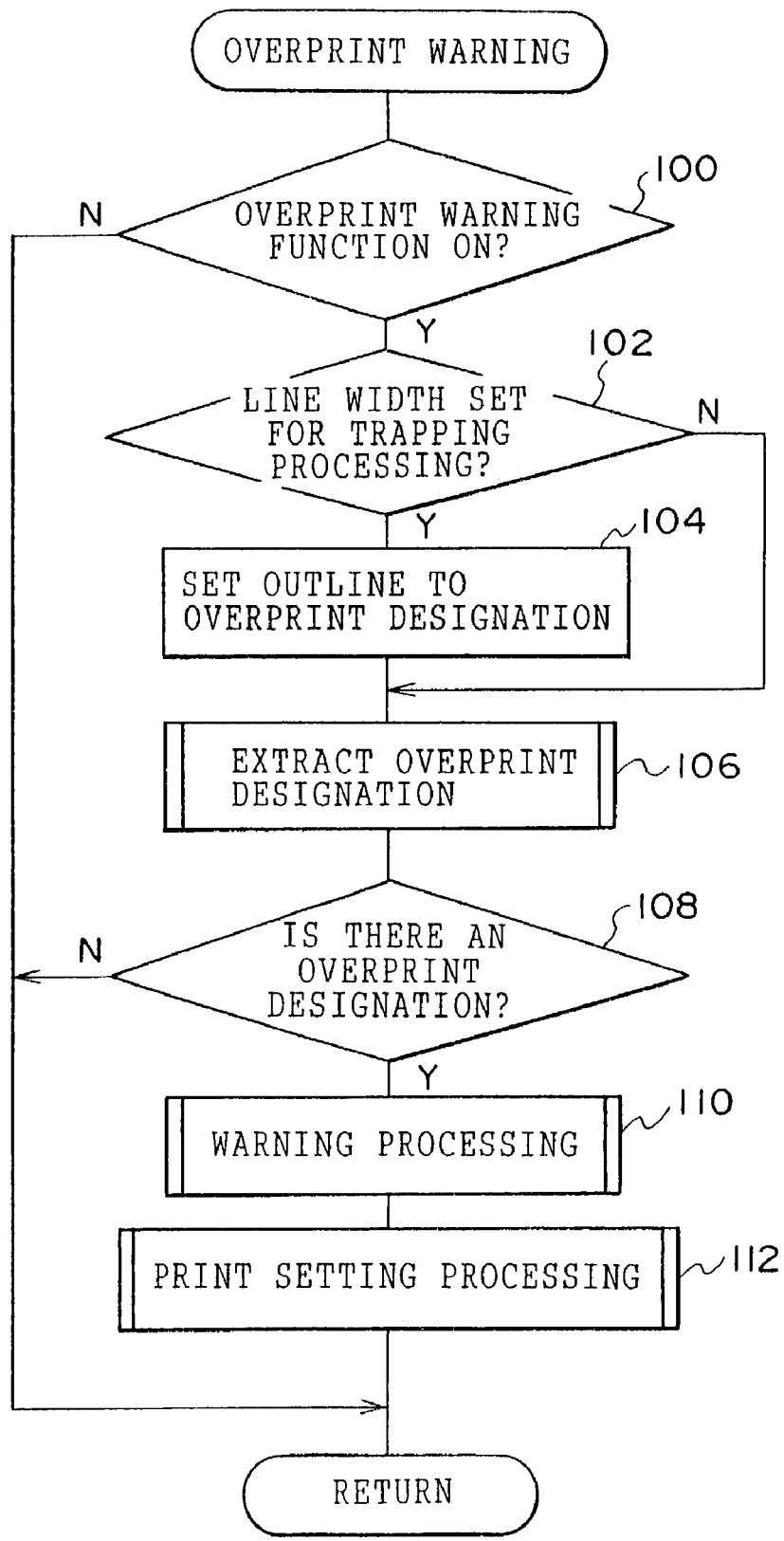

FIG. 6

| WARNING MESSAGE |

THERE IS AN IMAGE FOR WHICH OVERPRINTING HAS BEEN DESIGNATED.

Title: ○ ○ ○ ○

PRINTING PROCESSING  ☐ COLOR CONVERSION
☐ OUTLINE (DISPLAY PREVIEW)  (EXECUTE)

FIG. 7

| PROCESSING DESIGNATION |

Title: ○ ○ ○ ○

☐ COLOR CONVERSION    ☐ SET COLOR
☐ OUTLINE             ☐ DESIGNATION ☐
☐ PRINT WARNING PAGE  ☐ EXTRACT IMAGE
                      ☐ DELETE IMAGE (EXECUTE)

FIG. 8

| WARNING MESSAGE |
|---|

THERE IS AN IMAGE FOR WHICH OVERPRINTING HAS BEEN DESIGNATED

Title: ○ ○ ○ ○

☐ COLOR CONVERSION    ☐ SET COLOR
☐ OUTLINE             ☐ DESIGNATION ☐
☐ PRINT WARNING PAGE  ☐ EXTRACT IMAGE
                      ☐ DELETE IMAGE (DISPLAY PREVIEW)  (EXECUTE)

IMAGE PROCESSING DEVICE

BACKGROUND OF THE INVENTION

1. Field of the Invention

The present invention relates to an image processing device for carrying out image processing on the basis of drawing command or image data generated by various types of applications.

2. Description of the Related Art

As digitization in the field of printing processing has spread, the trend toward DTP (Desktop Publishing) has spread. DTP generates a page layout by generating, trimming, and editing an image in a processing device such as a personal computer, a work station, or the like, and generates a film for exposing a printing plate on the basis of this page layout (CEPS), or generates a press plate for printing by directly writing onto a printing plate (CTP: Computer to Plate).

In DTP, when proofreading is carried out in advance of printing or the like using an actual press plate, an image such as a page layout or the like displayed on a monitor can be printed out, by using the WYSIWYG function or the like, by a device such as a laser printer, a page printer, or the like.

In printing using a press plate, color printing is carried out by superposing images, which have been separated into the respective colors of CMYK. In applications used for DTP, designation of overprinting which superposes upper and lower images is possible. The reason for carrying out designation of overprinting is to prevent white gaps from arising at the boundary portion of the image due to the expansion and contraction of the paper or misregister around the boundary at the time of printing while the images are superposed.

On the other hand, for example, when upper and lower images are superposed, an image outputted from a printer is generally outputted such that the upper image knocks out the lower image. Therefore, there are cases in which the finish of a printed matter obtained using a press plate and the finish of a printed matter outputted from a printer are different from one another.

Thus, in order to verify the designation of overprinting at an application, separated images of the respective colors of CMYK are generated. The separated images of the respective color components are outputted by black-and-white printing, and the designation of overprinting must be verified by visual observation. Therefore, skill is needed, and the work of proofreading a page layout is troublesome.

On the other hand, there is a printer, which can simulate superposed printing of respective color images as in a printed matter obtained using a press plate. However, a printer which can carry out such processing is expensive and has the problem that it requires much time to print.

Japanese Patent Application Laid Open (JP-A) No. 2000-352813 proposes verification of overprinting. However, only overprinting by superposing of a black plate (K plate) and another color can be verified, and further, a comparatively expensive printer must be used.

SUMMARY OF THE INVENTION

The present invention has been achieved in consideration of the above-described facts, and it is an object thereof to provide an image processing device in which verification of a designation of overprinting can be easily and accurately carried out.

In order to achieve the above-described object, the invention provides an image processing device which carries out image processing on the basis of a drawing command or image data inputted from an image processing terminal, the image processing device comprising: a detecting component for detecting whether or not overprinting is set on an application, from the drawing command or the image data; and a notifying component for giving notice of a designation of overprinting on the basis of results of detection of the detecting component.

In accordance with the invention, the detecting component detects, from the drawing command or the image data, an image for which overprinting has been designated. When the detecting component detects an image for which overprinting has been designated, the notifying component notifies that there is such an image.

In this way, even when it is difficult to determine the presence/absence of an overprint designation on the display on a monitor or on a printed matter outputted from a printout device such as a printer or the like, it can be clearly determined whether an overprint designation has been given or not. Further, because this invention has a simple structure in which the detecting component and the notifying component are provided, the determination on overprinting can be easily carried out at low cost.

It is more preferable that the invention further comprises: an extracting component for extracting an image for which overprinting has been designated; and a setting component for setting image conversion so as to clarify the image extracted by the extracting component, at the time of the image is processed and outputted.

In this way, an image, which is overprinted on a processed output such as a printout based on image data or the like, can be accurately determined.

The setting component may add an outline of a predetermined color along a contour of the image extracted by the extracting component. Or, the setting component may convert the image extracted by the extracting component to a predetermined color. At this time, the color for conversion or the color of the outline may be set in advance, or may be designated from the image processing terminal.

Further, the setting component may effect setting such that the image extracted by the extracting component is deleted, or conversely, may effect setting such that at least image data of only the image extracted by the extracting component is generated.

Namely, the setting component may effect setting such that a printed matter for warning is printed out. At this time, the setting component may effect setting such that the printed matter for warning is printed along with a usual printed matter based on a drawing command or image data. Therefore, an image for which overprinting has been designated can be clearly and reliably confirmed visually.

Further, in the invention, the warning component preferably includes a display controlling component, which displayably transmits a warning message to the image processing terminal. At this time, the display controlling component preferably displays, on the image processing terminal, a request for input of a processing designation for the image detected by the detecting component. Or, the display controlling component may make a printout image, which corresponds to the image data, be able to be displayed on the image processing terminal.

BRIEF DESCRIPTION OF THE DRAWINGS

FIG. 4 is a flowchart showing an overview of printing processing using an overprint warning function in the embodiment.

FIG. 6 is a schematic diagram showing one example of a warning message.

FIG. 7 is a schematic diagram showing one example of a display of a processing designation for the image for which overprinting has been designated.

FIG. 8 is a schematic diagram showing another example of a warning message.

DESCRIPTION OF THE PREFERRED EMBODIMENT

Figure 1:
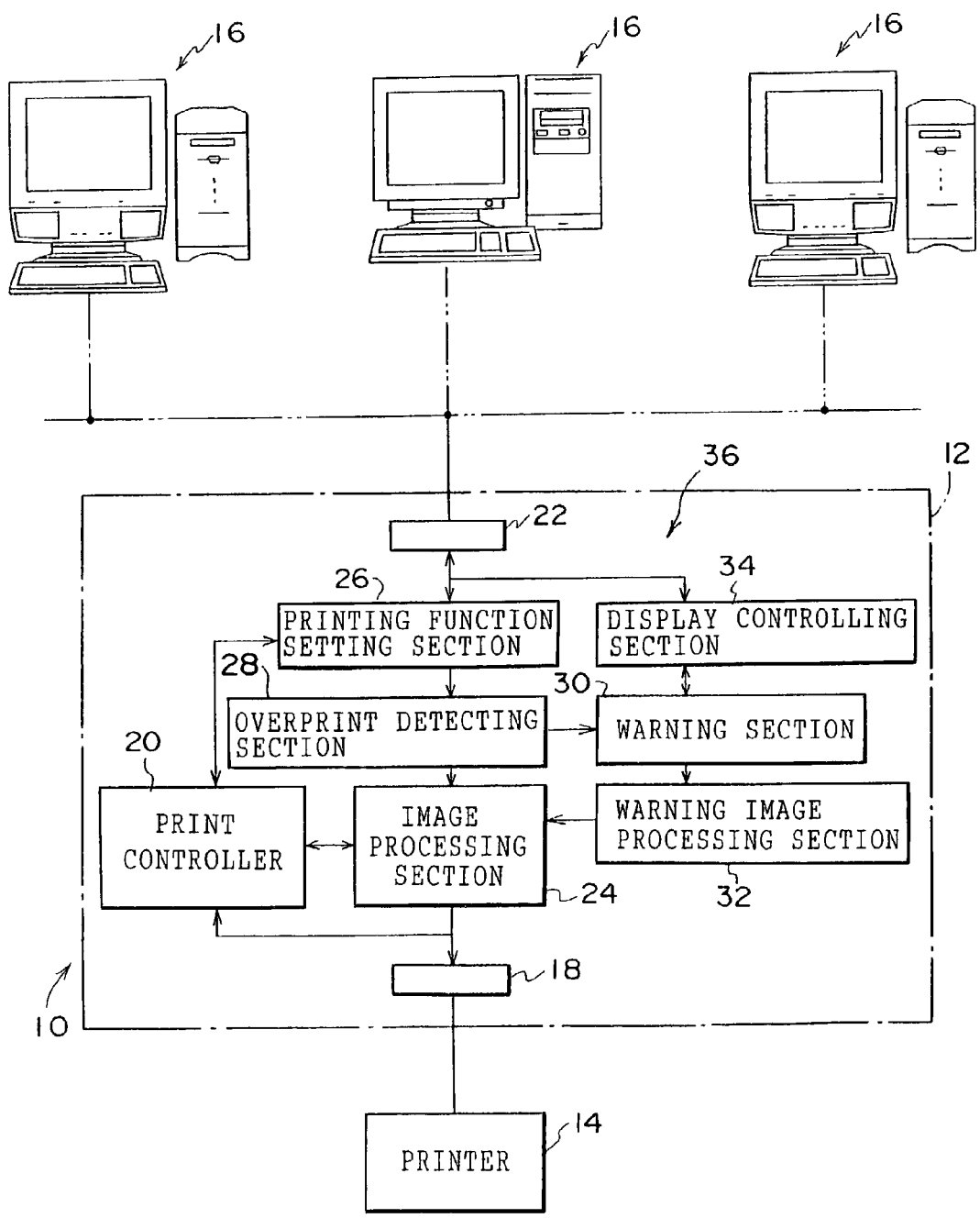
FIG. 1 is a schematic block diagram showing main portions of a print server disposed with an image processing device relating to the present embodiment.

Hereinafter, an embodiment of the present invention will be described. FIG. 1 shows a schematic structure of a printing system 10 to which the present embodiment is applied. The printing system 10 includes a print server 12 structured by adding a PCI board having predetermined functions to, for example, a personal computer (PC) having a general structure. Further, a printer 14 is connected as a printout device to the print server 12, and can print out an image processed at the print server 12.

Further, a personal computer, a work station, and the like are connected as client terminals 16 to the print server 12. The client terminals 16 are used for DTP, which carries out image processing, such as generating, trimming, and editing of an image, by using various types of applications. The print server 12 carries out printing out of images corresponding to print jobs by drawing command or image data being inputted thereto as print jobs from these client terminals 16.

The printing system 10 may have a structure in which a plurality of printers 14 is connected to a print server 12. Alternatively, the plurality of client terminals 16 may be connected to the print server 12 via a network such as a LAN, a WAN, or the like.

The print server 12 used in the embodiment has a general structure in which an external memory such as a ROM, a RAM, an HD, or the like is provided at the print server 12, and the print server 12 operates in accordance with operation programs stored in the ROM, and executes processing for system graphics, images, characters, tables, or the like on the basis of programs stored in the ROM or the external memory.

Further, the print server 12 is provided with input devices such as a keyboard or a mouse (neither is illustrated), and a display device such as a CRT display or the like. Further, in the print server 12 as well, printing processing of an image displayed on the display device is possible (WYSIWYG function).

A two-way interface 18 such as an Ethernet or the like, and a print controller 20 are provided in the print server 12. The print controller 20 is connected to the printer 14 via the two-way interface 18. Further, a network interface 22 is provided in the print server 12. An image data and drawing command are inputted as a print job from the client terminal 16 via the network interface 22.

On the other hand, an image processing device 36 applied to the invention is formed in the print server 12. The image processing device 36 has an image processing section 24, and generates raster data on the basis of a drawing command or image data inputted as a print job. Due to the raster data being controlled by the print controller 20 and being outputted to the printer 14, a printed matter based on the image data can be obtained.

By using various types of DTP applications such as, for example, PhotoShop, Illustrator (both trade names of products of Adobe Systems Incorporated), QuarkXPress (the trade name of a product of Quark, Inc.), or the like, the client terminal 16 carries out image processings such as image generating, trimming, editing, and the like, and generates image data such as a page layout (hereinafter, referred to as a "page layout").

In the present embodiment, the page layout generated by the client terminal 16 is used in generating a film used in exposing a printing plate by a color electronic plate making system (CEPS), or is used in exposing a printing plate in direct plate making (CTP). Printing processing is carried out by a press plate generated on the basis of this page layout.

In DTP, before generating a press plate based on the page layout, proof printing, which generates a printed matter for proofreading which is called a color proof or the like (and referred to as a "proof", hereinafter), is carried out. Proofreading of the page layout is carried out on the basis of this proof printing.

When carrying out this proof printing, the drawing command and the image data such as the page layout from the client terminal 16 are outputted to the printer server 12 as a print job. The page layout inputted from the client terminal 16 may be in YMCK format, or may be in RBG format, or may be such that both of these formats are used. In the image processing section 24, raster data of the respective colors of Y, M, C, K are generated from the page layout, and are outputted to the printer 14.

A printing function setting section 26 is provided in the image processing device 36 formed in the print server 12. In the printing function setting section 26, the settings of the printing functions on the drawing command of a print job are read, and the printing functions at the time of carrying out image processing and printing processing are set. The setting of the printing functions is not limited to a setting on the print job, and for example, the print server 12 may extract the name of the application, which generated the print job, and settings, which are set in advance and stored, may be used as standard settings on the basis of the results of the extraction.

Figure 2:
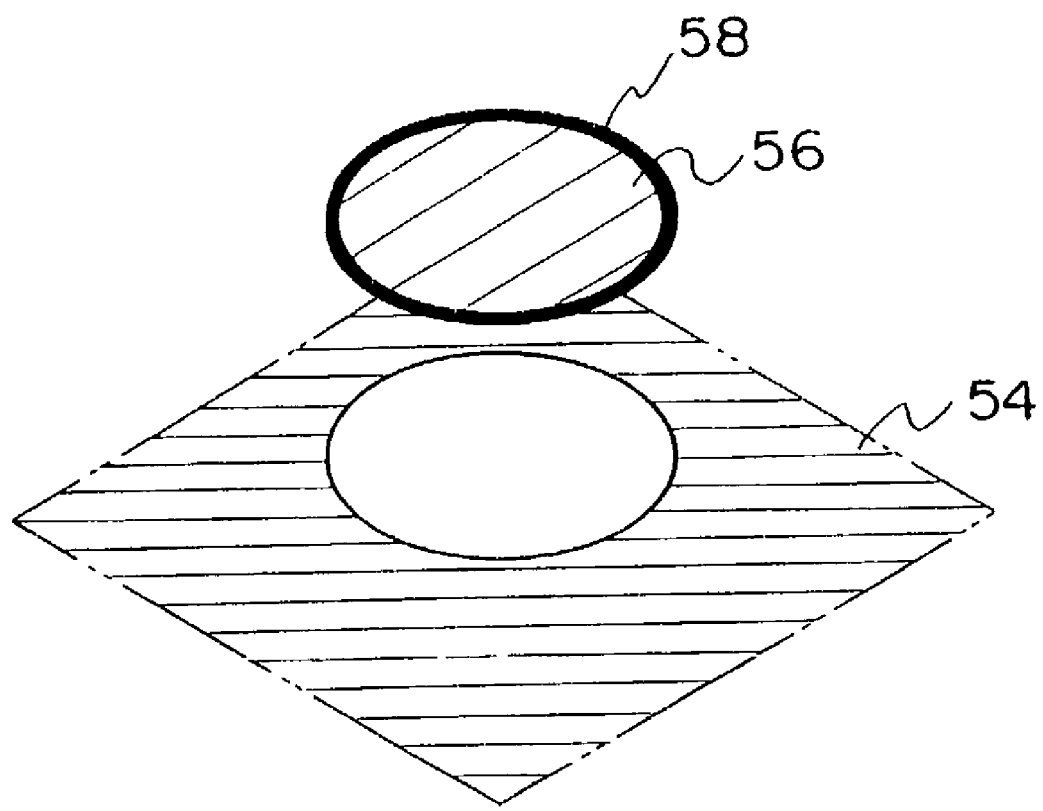
FIG. 2 is a schematic diagram showing trapping processing as one example of an image for which overprinting has been designated.

As shown in FIG. 2, among the page layouts generated by using applications at the client terminals 16, there are page layouts in which a lower image 54 is knocked out and an upper image 56 is fit into the knocked out portion of the lower image 54. At this time, in order to fill in the gap between the images 54 and 56, in the application, it is possible to set a trapping processing such as a spreading processing which widens the outline of the image 56 or a choking processing, which narrows the knocked out region of the lower image. Further, among some applications such as a QuarkXPress and the like, there are applications, which do not actually draw the trapped portion, even if a trapping processing is set.

In the printing function setting section 26, when the lower image 54 is knocked out and the image 56 is fit into the knocked out portion, if the line width of an outline 58 filling in the portion trapped between the images 54, 56 is set, the outline 58 can be regarded as overprinting in an overprint warning function.

Further, as shown in FIG. 1, an overprint detecting section 28 is provided in the image processing device 36. The overprint detecting section 28 detects whether or not overprinting is designated for any of the images, from, for example, the drawing command or the image data.

Figure 3A:
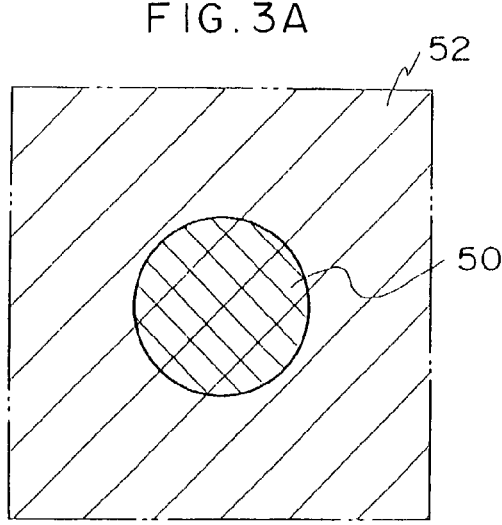
FIG. 3A is a schematic diagram showing an image for which overprinting has been designated.

Namely, for example, as shown in FIG. 3A, when an upper image 50 and a lower image 52 are superposed on a page layout, or the like, the overprint detecting section 28 detects whether the upper and lower images 50, 52 are superposed, or whether a designation has been given for the upper image 50 to be fit into the portion at which the lower image 52 was knocked out.

As shown in FIG. 1, a warning section 30 and a warning image processing section 32 are provided in the image processing device 36 of the print server 12. When an image for which overprinting has been designated is detected at the overprint detecting section 28, the warning section notifies the client terminal 16 which outputted the print job that there is an overprint designation.

At this time, in the warning section 30, by using a display controlling section 34, a predetermined warning message is displayed on a monitor of the client terminal 16. Further, the display controlling section 34 displays a screen requesting selection of processings for the overprint designation.

Figure 3B:
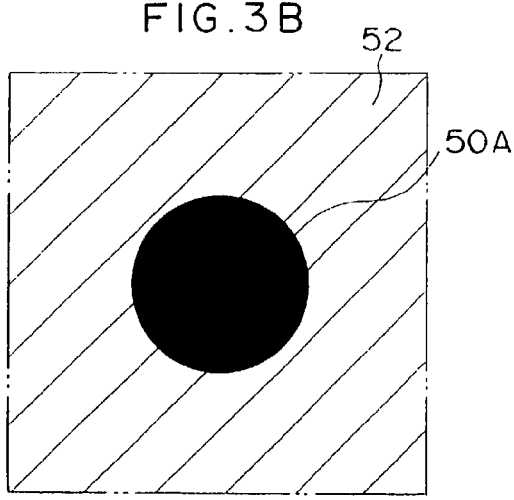
FIG. 3B is a schematic diagram showing color conversion of the image for which overprinting has been designated.

The warning image processing section 32 carries out a predetermined processing for an image for which overprinting has been designated and which has been detected at the overprint detecting section 28. For example, as shown in FIG. 3B, when an overprint designation is given for the upper image 50 of the images 50, 52 superposed above and below, this processing converts the image into an image 50A which is painted out with a warning color such as magenta or the like, or any set color.

Figure 3D:
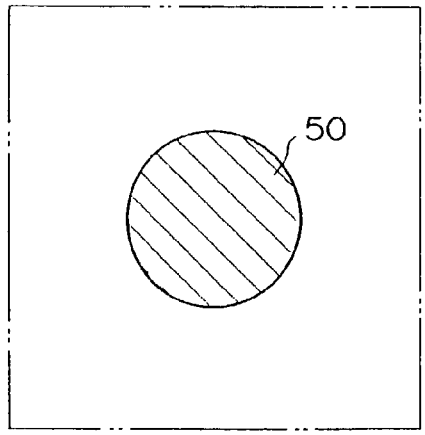
FIG. 3D is a schematic diagram showing extraction of the image for which overprinting has been designated.
Figure 3C:
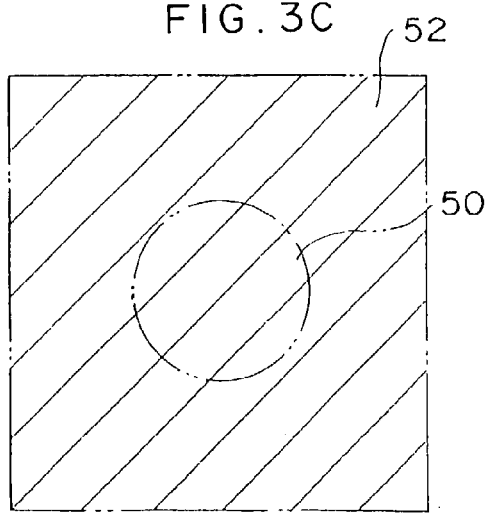
FIG. 3C is a schematic diagram showing deletion of the image for which overprinting has been designated.

Further, in the warning image processing section 32, printing out in which the lower image 52 is printed around the upper image 50, and setting of a printout in which the upper image 50 is deleted, is possible. Namely, in addition to a normal printout by the printer 14 and based on the image data (for example, the image shown in FIG. 3A), a printout of a printed matter in which the image 50 is deleted as shown in FIG. 3C, or a printout of a printed matter of the image 50 which is extracted as shown in FIG. 3D, is set as a warning page.

Figure 3E:
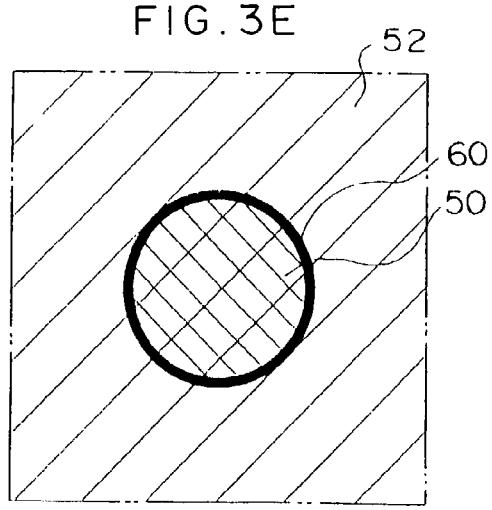
FIG. 3E is a schematic diagram on which an outline is added to the image for which overprinting has been designated.

Further, as shown in FIG. 3E, in the warning image processing section 32, a setting in which an outline 60 along the contour of the image 50 is bordered with a warning color or a designated color is possible. The outline 58 in trapping processing is set to be converted to a warning color or any set color, in the same way as the outline 60 of the image 50.

In the image processing section 24, processing such as image conversion (generation of raster data) or the like is carried out on the basis of the setting of the warning image processing section 32. A conventionally known and any structure can be applied to the image processing section 24, and detailed description will be omitted.

Processing for the overprint warning function in the print server 12 will now be described. The flowchart shown in FIG. 4 starts when a print job outputted from the client terminal 16 is received and printing processing for the print job is executed. In the first step 100, it is verified whether the overprint warning function is set or not. At this time, when the overprint warning function is set, the judgment is affirmative in step 100, and the routine proceeds to step 102. At this time, the print job is set by a specific application set in advance, and at this time, it is verified whether a line width of the outline 58 for trapping processing is set or not.

When a line width of the outline 58 for trapping processing is designated, the determination is affirmative in step 102, and setting is carried out in step 104 such that the outline 58 added at the time of trapping processing is detected as an image for which overprinting has been designated. Namely, setting is carried out such that the outline 58 is detected as an image, which is overprinted.

In this way, when the overprint warning function is set, the routine proceeds to step 106, and an overprint detection and extraction of an overprint image are carried out. At this time, when a line width of the outline 58 at the time of trapping processing is set, the outline 58 is also detected as an image for which overprinting has been designated. This detection of overprinting and detection of the outline 58 can use a conventionally known and any structure such as, for example, a description on a drawing command.

In next step 108, it is verified whether an image for which overprinting has been designated has been detected or not. Here, when an image for which overprinting has been designated is detected, the determination in step 108 is affirmative, and steps 110 and 112 are executed.

Figure 5A:
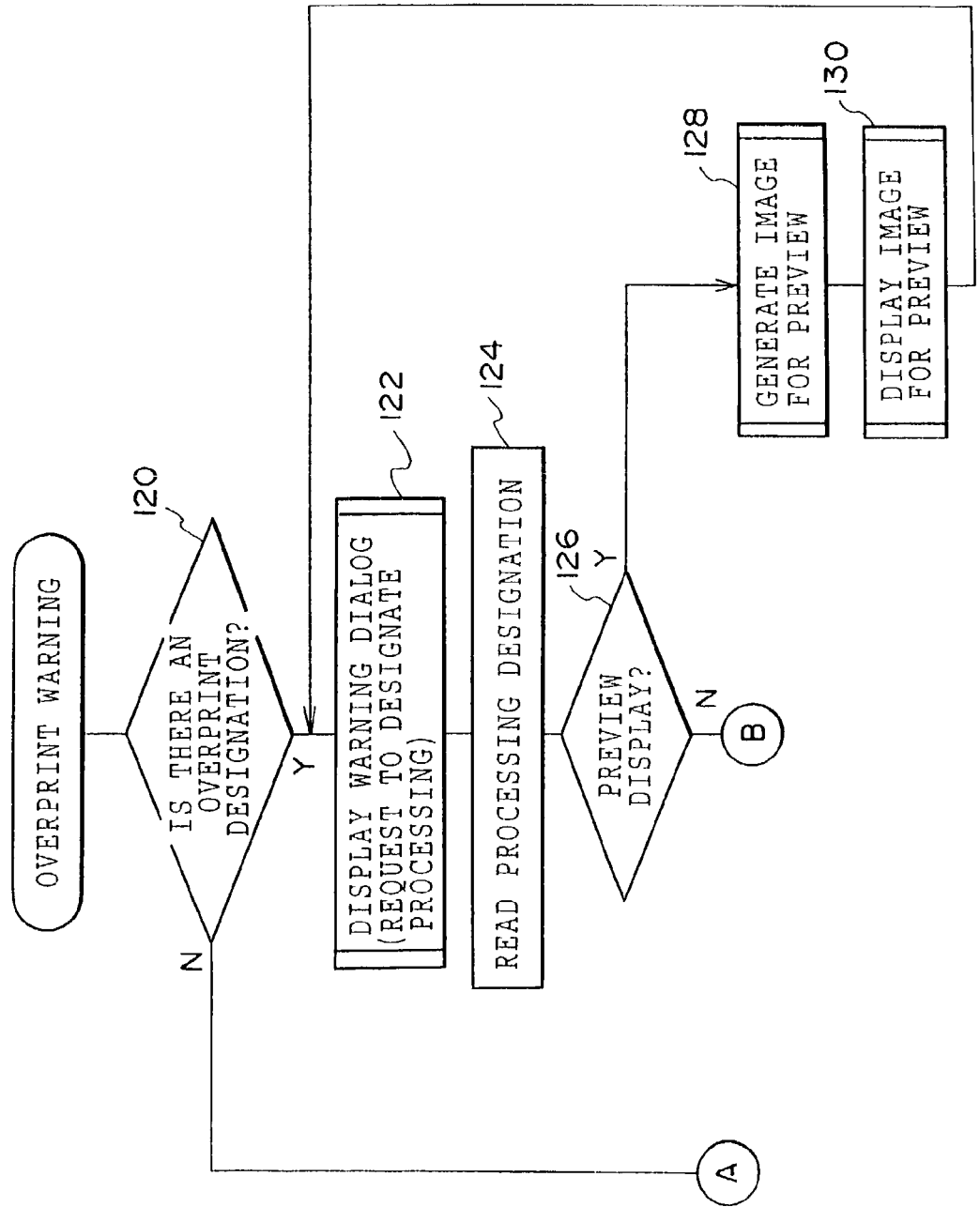
FIGS. 5A and 5B are flowcharts showing one example of the overprint warning function.
Figure 5B:
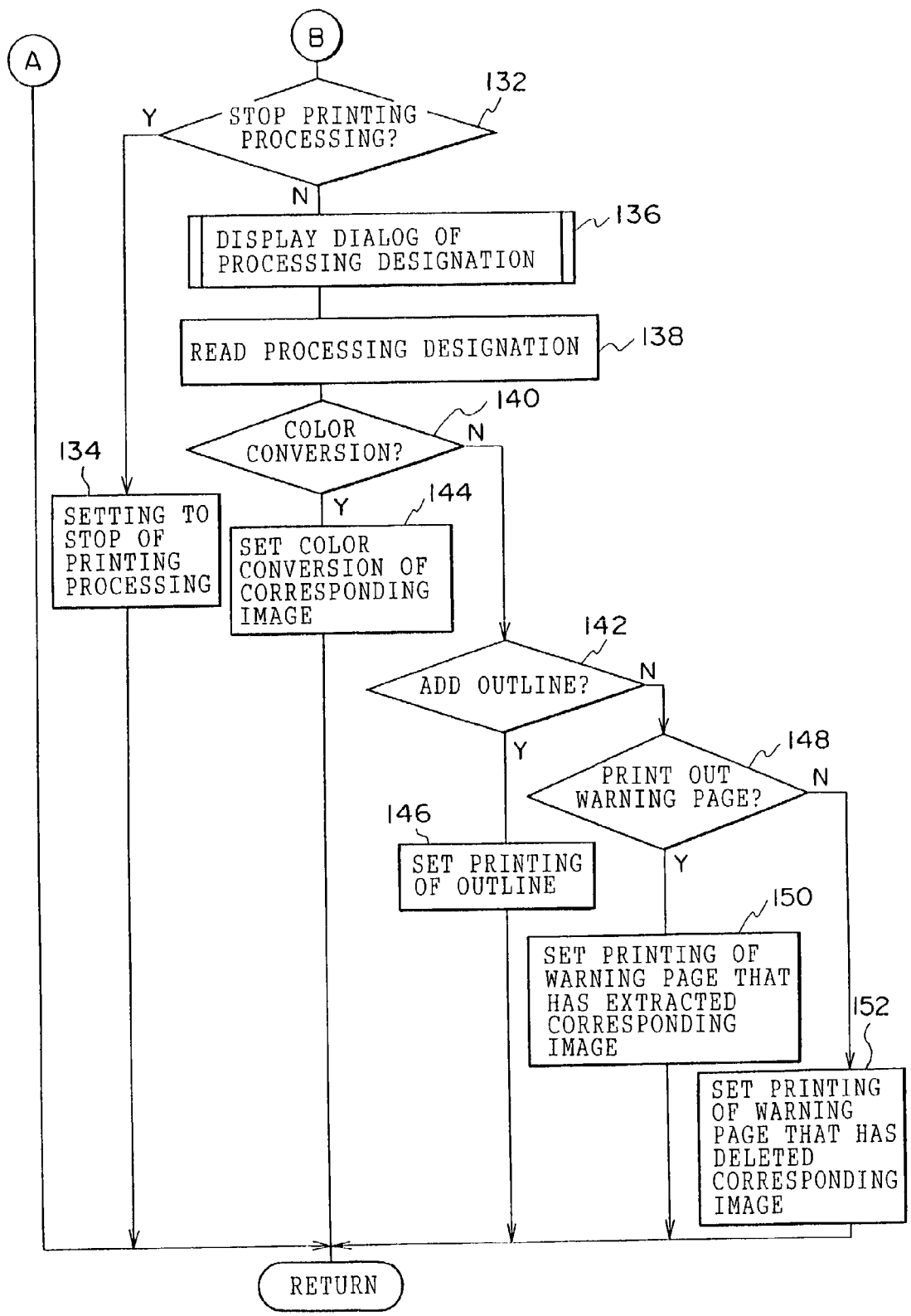

In FIGS. 5A and 5B, overviews of warning processing and print setting for the overprint designation (corresponding to steps 110, 112 of FIG. 4) are shown.

In these flowcharts, in a state in which the overprint warning function is set, when an image for which overprinting has been designated is detected in the first step 120, the determination is affirmative, and the routine proceeds to step 122.

In step 122, a dialog of a warning message, which warns that there is an image for which overprinting has been designated, is displayed on a monitor of the client terminal 16, which transmitted the print job.

In FIG. 6, one example of the dialog of the warning message is shown. In this dialog, a menu for selecting whether or not printing processing is to be continued is displayed along with the warning message, and inputting of a processing designation based on the selection menu is requested. Further, a preview display can be designated from this dialog.

When the processing designation is inputted from the client terminal 16, in the flowchart shown in FIG. 5A, the routine proceeds to step 124 where the inputted processing designation is read. Thereafter, in step 126, it is verified whether or not a preview display of the corresponding page layout (printing page) is designated.

At this time, when preview display is designated, the determination is affirmative in step 126. The routine proceeds to step 128 where image conversion for previewing is carried out, and a preview image is displayed on the monitor of the client terminal 16 (step 130). When preview display is carried out, the display is such that the image for which overprinting has been designated is clarified.

On the other hand, when preview display is not designated, or when preview display is completed and the inputted processing designation is read, the determination is negative in step 126, and the routine proceeds to step 132 in FIG. 5B. In step 132, first, it is verified whether printing processing is to be stopped or not.

When stop of printing processing is set, the determination is affirmative in step 132, and the routine proceeds to step 134 where stop of printing processing is set. Therefore, the presence/absence of an image for which overprinting has been designated can be accurately determined on the page layout, without printing out.

On the other hand, when continuation of printing processing is set, the determination is negative in step 132, and the routine proceeds to step 136. In this step 136, a dialog requesting inputting of detailed settings of processing is displayed on the monitor of the client terminal 16.

In FIG. 7, one example of this dialog is shown. As processings for an image for which overprinting has been designated, for example, color conversion of the image, adding of the outline 60 (hereinafter, "outline 60" includes "outline 58"), printing out of a warning message, and the like are possible. Input of a designation of any of these processings is requested. Further, when color conversion of the image or adding of the outline 60 is selected, a warning color (e.g., magenta) set in advance is used, or any color can be designated.

Here, when a designation of the printing processing is inputted on the basis of the dialog, in the flowchart of FIG. 5B, the processing designation is read in step 138, and in step 140, it is verified whether color conversion of the image is designated or not. When the determination is negative, in step 142, it is verified whether adding of the outline 60 is designated or not.

When color conversion of the image is designated, the determination is affirmative in step 140, and the routine proceeds to step 144. In step 144, a color for conversion is set from the read processing designation, and the corresponding image is set to be converted to the set color and to be printed out.

In this way, the image for which overprinting has been designated is converted to the predetermined color so as to be clarified, and is printed out from the printer 14 (see FIG. 3B).

Further, when adding of the outline 60 is designated (i.e., when the determination is negative in step 140 and the determination is affirmative in step 142), the routine proceeds to step 146 where the color of the outline 60 is set from the read processing designation, and setting is carried out such that the outline 60 having a predetermined width and color is printed around the corresponding image.

In this way, on a printed matter outputted from the printer 14, the image for which overprinting has been designated is bordered so as to be clarified by the outline 60 (see FIG. 3E). With respect to the outline 58 of trapping processing, because the settings are the same in step 144 and step 146, the designation of color conversion of an image may be omitted from the dialog.

On the other hand, when printing out of a warning page is designated, the determinations are negative in steps 140 and 142, and the routine proceeds to step 148. In step 148, it is verified whether setting has been carried out such that the image for which overprinting has been designated is to be extracted and printed out as a warning page, or whether printing is to be effected with the image for which overprinting has been designated being deleted.

When extracting of the image for which overprinting has been designated is designated, the routine proceeds to step 150, and setting is carried out such that, as the warning page, the image for which overprinting has been designated is extracted, and only the corresponding image is printed out.

In this way, a warning page (see FIG. 3D), which is the extracted image for which overprinting has been designated is, printed out from the printer 14. At this time, a normal printout based on the print job is also carried out.

On the other hand, when deleting of the image for which overprinting has been designated is designated, the routine proceeds to step 152. In this step 152, setting, such as a page layout, is carried out, from which the image for which overprinting has been designated is deleted, is printed out as a warning page.

Therefore, a normal print page based on the page layout and the warning page from which the image for which overprinting has been designated is deleted can be printed out.

When the image for which overprinting has been designated is detected in this way, warning is given such that the corresponding image is clarified, or the corresponding image is printed out so as to be clarified. Therefore, there is no need to use a printer, which is high priced and can simulate outputting of a printing machine. Further, output of a printed matter, in which the image for which overprinting has been designated is clarified simply, is possible, and appropriate proofreading is easily carried out.

In the embodiment, description is given of a case in which a warning message and a designation of the processing are individually displayed. However, the warning message and the designation of the processing may be carried out in one dialog. In this case, for example, display of the dialog shown in FIG. 8 can be used. In this dialog, a selection menu for a processing designation is displayed with the warning message. The processing designation assumes that printing processing is to be continued, and in the processing designation, any of color conversion and the color of the corresponding image, adding of the outline 60 and the color thereof, and printing of a warning message, can be designated. Further, when printing out of a warning message is designated, whether it is a warning page on which the corresponding image is deleted or extracted can be designated.

In the above description, inputting of a processing designation for the image for which overprinting has been designated is requested. However, the invention is not limited to the same. For example, when an image for which overprinting has been designated is detected, it is possible to set in advance whether, for the corresponding image, color conversion is to be carried out, the outline 60 is to be added, or a warning page is to be printed out. When an image for which overprinting has been designated is detected, it is possible to merely notify the client terminal 16 by a dialog or the like.

Further, the dialogs shown in FIG. 6 through FIG. 8 show examples, and a display of any structure can be used for the warning display and the request for input of a processing designation. The warning at the time of detection of an image for which overprinting has been designated is not limited to display on the monitor of the client terminal 16. Any method can be applied provided that the corresponding image can be clarified on the printed matter.

Moreover, in the embodiment, description is given of a case in which the image processing device of the invention is applied to the print server 12. However, the invention is not limited to the same. The image processing device of the invention may be provided, for example, at an intermediate server disposed between a plurality of client terminals 16 and a print server or a printer, as an image processing device which carries out processing on the basis of image data inputted from the client terminals. Or, the image processing device of the invention may be provided on a network together with the client terminals 16, and may be used as an image processing device carrying out predetermined processings with respect to image data inputted from the client terminals.

In accordance with the above-described invention, when an image for which overprinting has been designated is detected, because warning is given so as to clarify the corresponding image, an excellent effect is achieved in that the verification of an image for which overprinting has been designated, or the verification of the presence/absence or the like of an image for which overprinting has been designated, is possible easily and at a low cost.

What is claimed is:

1. An image processing device for carrying out image processing on the basis of a drawing command or image data inputted from an image processing terminal, the image processing device comprising:
    a detecting component for detecting whether or not overprinting is set on an application, from the drawing command or the image data;
    a notifying component for giving notice of a designation of overprinting on the basis of results of detection of the detecting component;
    an extracting component for extracting an image for which overprinting has been designated; and
    a setting component for setting image conversion so as to clarify the image extracted by the extracting component, at the time the image is processed and outputted, wherein the setting component carries out setting such that an outline of a predetermined color is added along a contour of the image extracted by the extracting component.

2. The image processing device according to claim 1, wherein the outline is set to a color which is set in advance.

3. The image processing device according to claim 1, wherein the outline is set to a color which is designated by the image processing terminal.

4. The image processing device according to claim 1, wherein the setting component carries out setting such that the image extracted by the extracting component is converted to a predetermined color.

5. The image processing device according to claim 4, wherein a conversion color of the image is set to a color, which is set in advance.

6. The image processing device according to claim 4, wherein a color for conversion of the image is set to a color which is designated by the image processing terminal.

7. The image processing device according to claim 1, wherein the setting component carries out setting such that the image extracted by the extracting component is deleted from the image data.

8. The image processing device according to claim 1, wherein the setting component carries out setting such that at least image data of only the image extracted by the extracting component is generated.

9. The image processing device according to claim 1, wherein the notifying component has a display controlling component for displayably transmitting a warning message to the image processing terminal.

10. The image processing device according to claim 9, wherein the display controlling component displays, on the image processing terminal, a request for input of a processing designation for the image detected by the detecting component.

11. The image processing device according to claim 9, wherein the display controlling component makes a printout image, which corresponds to the image data, displayable on the image processing terminal.

* * * * *